Figure 1:
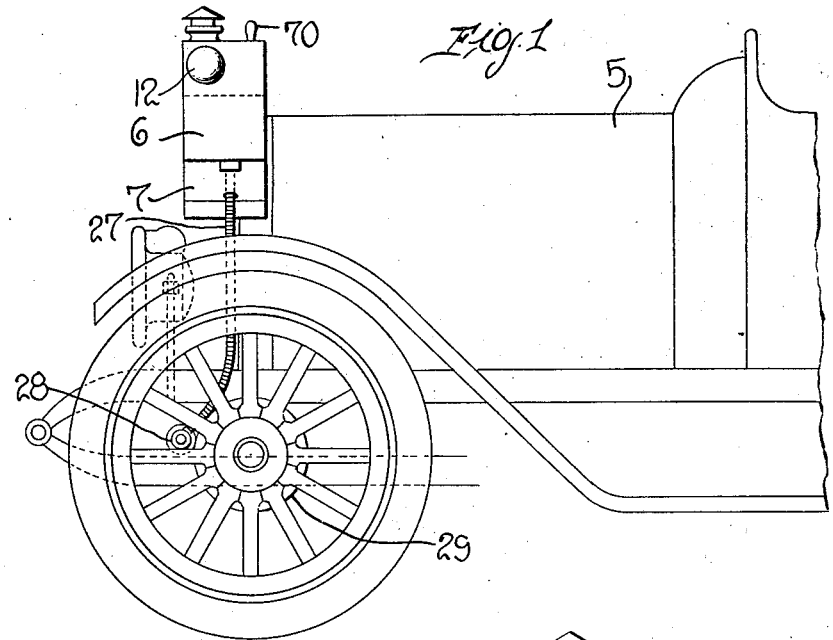

R. B. WILCOX.
ALARM MECHANISM.
APPLICATION FILED JULY 6, 1914.

1,166,958.

Patented Jan. 4, 1916.
4 SHEETS—SHEET 1.

Inventor
ROBERT B. WILCOX

Witnesses

By Watson E. Coleman
Attorney

R. B. WILCOX.
ALARM MECHANISM.
APPLICATION FILED JULY 6, 1914.

1,166,958.

Patented Jan. 4, 1916.
4 SHEETS—SHEET 2.

Witnesses
Robert M. Sutphen
A. I. Hinf

Inventor
ROBERT B. WILCOX
By Watson E. Coleman
Attorney

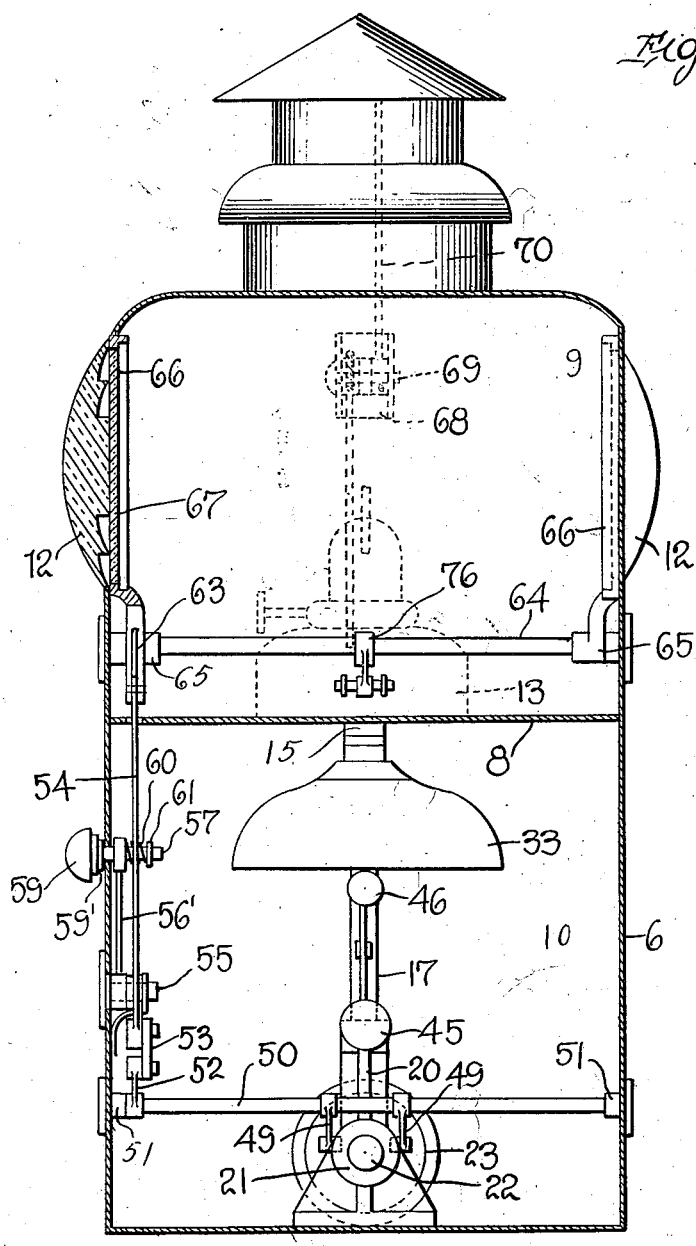

R. B. WILCOX.
ALARM MECHANISM.
APPLICATION FILED JULY 6, 1914.
1,166,958.
Patented Jan. 4, 1916.
4 SHEETS—SHEET 4.
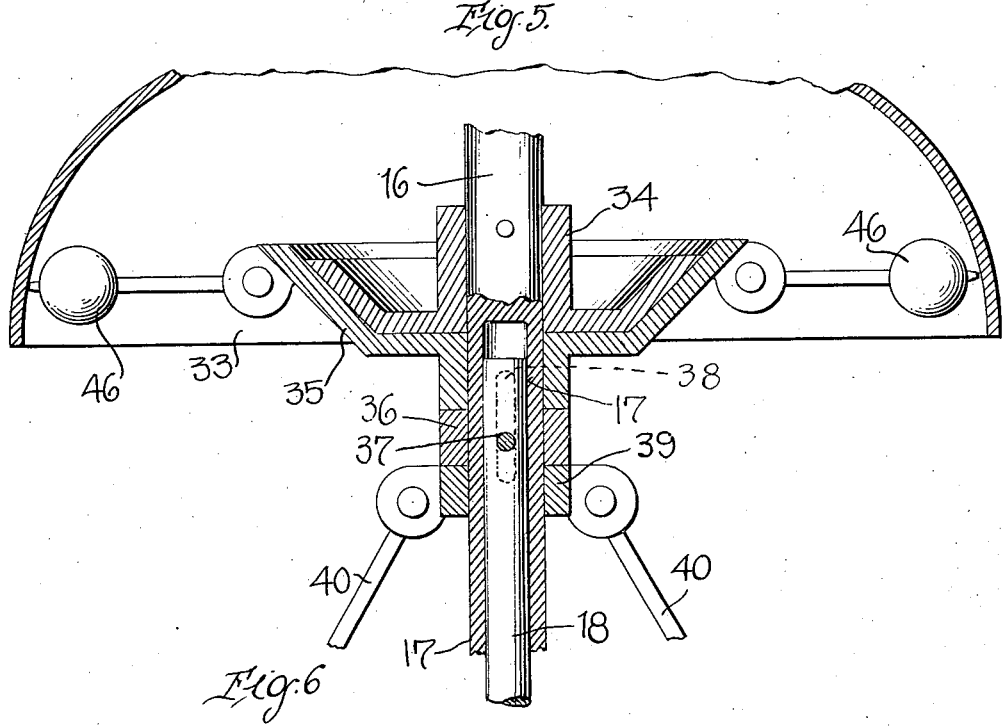
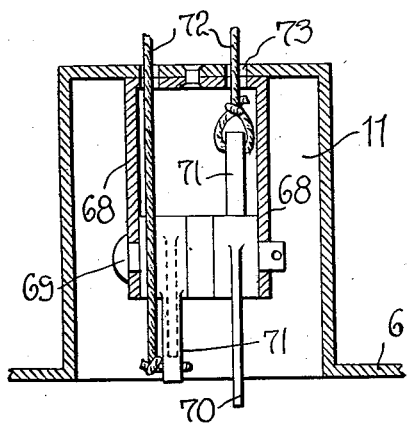
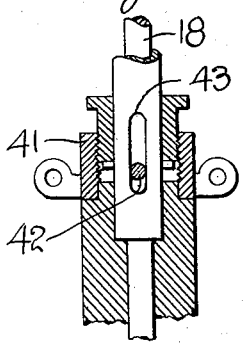
Witnesses
Robert M. Sutphen
A. S. Hind
Inventor
Robert B. Wilcox
By Watson E. Coleman
Attorney

UNITED STATES PATENT OFFICE.

ROBERT B. WILCOX, OF HONOLULU, TERRITORY OF HAWAII.

ALARM MECHANISM.

1,166,958.   Specification of Letters Patent.   Patented Jan. 4, 1916.

Application filed July 6, 1914. Serial No. 849,258.

*To all whom it may concern:*

Be it known that I, ROBERT B. WILCOX, a citizen of the United States, residing at Honolulu, in the Territory of Hawaii, have invented certain new and useful Improvements in Alarm Mechanisms, of which the following is a specification, reference being had to the accompanying drawings.

This invention relates to an improved alarm mechanism, and has for its primary object to provide means whereby the operator of a motor cycle, automobile, or other vehicle will be given a warning when he is driving the machine at a speed in excess of that allowed by law.

The invention has for another object to produce a device of the above character which may be readily rendered inoperative when the machine is being driven through districts having no restrictions as to speed, the same being so located upon the machine, however, that the operator can not render the mechanism either operative or inoperative without first completely stopping the machine and descending from his seat.

The invention further contemplates the provision of a pair of semaphore arms which are automatically moved to a visible position to indicate to the traffic officers that the mechanism is properly set for operation, or that the same is in an inoperative condition and will not give the necessary warning.

The invention has for a further object to provide in addition to the semaphore arms, above referred to, a night signal consisting of a movable colored lens automatically actuated when the mechanism is placed in operative condition and disposed between an uncolored lens mounted in the case wall and a lamp or torch arranged in the casing.

The invention has for an additional object to provide an alarm device of the above character which is comparatively simple and inexpensive in its construction, efficient and reliable in operation and highly serviceable and convenient in practical use.

With the above and other objects in view, the invention consists in novel features of construction, combination, and arrangement of parts as will be hereinafter referred to and more particularly pointed out in the specification and claims.

For a full understanding of the invention, reference is to be had to the following description and accompanying drawings, in which—

Figure 2:
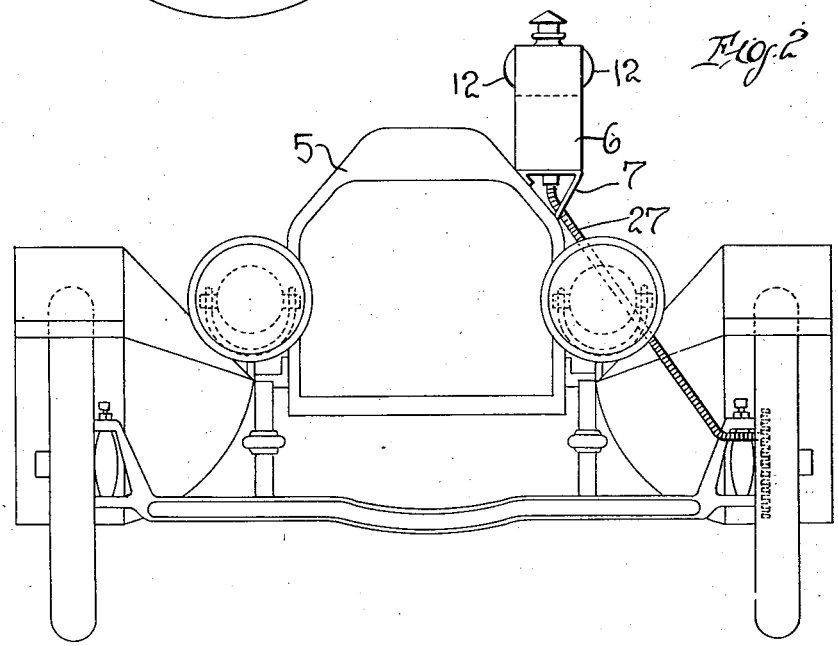
Figure 3:
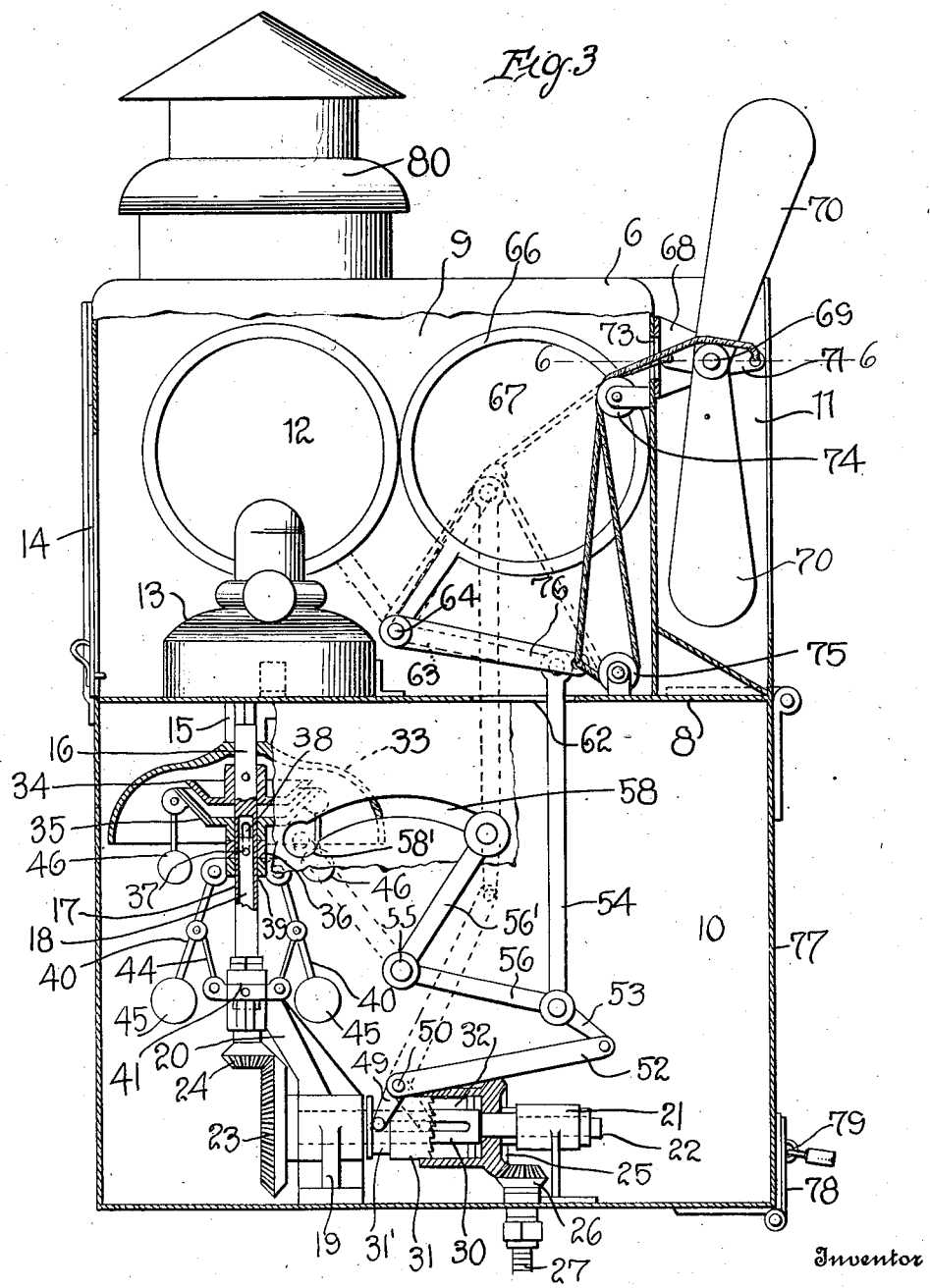

Figure 1 is a side elevation of the forward portion of an automobile showing my improved alarm device applied thereto; Fig. 2 is a front elevation; Fig. 3 is an enlarged side elevation, parts of the casing being broken away and other parts shown in section; Fig. 4 is an enlarged detail vertical section showing the operative condition of the alarm proper; Fig. 5 is an enlarged fragmentary sectional view, illustrating in a second position certain of the parts as disclosed in Fig. 3; Fig. 6 is a section taken on the line 6—6 of Fig. 3; Fig. 7 is an enlarged detail section illustrating the mounting of the lower end of the sliding clutch rod.

Referring in detail to the drawings, 5 designates an automobile to which I have shown my invention applied. It will, however, be obvious that the device may be also employed upon motor cycles and various other motor vehicles.

The mechanism of the alarm device to be hereinafter described is mounted within a sheet metal casing 6 which is suitably secured upon a suitable bracket 7 mounted upon one side of the radiator or hood of the machine at its forward end as clearly shown in Figs. 1 and 2 of the drawings. Any other suitable support for the device may, however, be provided. The casing 6 is formed with a horizontal partition 8 which divides the interior of the casing into upper and lower compartments 9 and 10 respectively. The rear wall of the upper compartment 9 is formed with an external pocket or recess 11 for a purpose to be hereinafter referred to. In each of the side walls of the compartment 9 contiguous to its forward end a white uncolored lens indicated at 12 is suitably mounted and secured. A lamp or torch 13 is arranged in said compartment upon the partition wall 8 between these lenses.

The forward end wall of the compartment 9 is provided with an opening which is adapted to be closed by a vertical sliding door 14 whereby access may be had to the compartment 9 for the purpose of removing said lamp and replenishing the supply of coal-oil or other liquid fuel. To the under side of the horizontal partition wall 8 adjacent its forward end a bearing plate 15 is secured, said plate being provided with a bearing socket to receive the upper end of a vertical shaft 16. The lower portion of this shaft is hollow or longitudinally bored as at 17, and in said bore a rod 18 is loosely arranged for vertical movement. The lower end of the shaft 16 is journaled in an arm 20 formed upon the bearing member 19 which is secured to the bottom wall of the lower compartment 10. A second bearing 21 is also secured upon said bottom wall and in these alined bearings a shaft 22 is rotatably mounted. Upon one end of this shaft a bevel gear 23 is fixed for meshing engagement with the bevel pinion 24 secured to the lower end of the vertical shaft 16. Upon the shaft 22 a bevel gear 25 is loosely mounted and this gear is engaged by a bevel pinion 26 journaled in the bottom wall of the casing. One end of a flexible shaft 27 is connected to the pinion 26, and the other end of this shaft is equipped with a gear pinion 28 which meshes with a cog gear wheel 29 secured to one of the forward wheels of the automobile or other machine. The shaft 22 is formed with an enlarged portion 30 upon which the sliding clutch collar 31 is splined or keyed. This clutch collar moves within a tubular extension or sleeve 32 formed integral with the bevel gear 25 and at the inner end of this sleeve clutch teeth are provided on the gear for engagement by complementary clutch teeth formed on the end face of the collar 31 as will be readily understood. The particular actuating means for this sliding collar whereby the gear 25 may be connected with the shaft 22 for rotation therewith will be later set forth in detail.

To the bearing plate 15 a bell bowl 33 is detachably connected, said bowl being disposed in concentric relation to the shaft 16. Upon said shaft and within the bowl 33 an inverted clutch disk 34 is fixed. 35 designates a similar clutch disk loosely mounted upon the shaft 16 below the disk 34 and supported by a collar 36. A transversely disposed pin 37 is secured at its ends in opposite sides of said collar and extends through longitudinal slots 38 provided in the upper end of the hollow portion 17 of the shaft 16. A second collar 39 is fixed upon the shaft 16 below the collar 36 and to opposite sides of said collar the upper ends of the opposed arms 40 of a centrifugal governor are pivotally connected. A sliding collar 41 is loosely engaged upon the lower end of the shaft 16 above the bearing arm 20 and a transverse pin 42 is secured at its opposite ends in said collar and extends through longitudinal slots 43 in the tubular portion of the shaft, said pin being fixed in the lower end of the rod 18. This latter collar is connected to the governor arms 40 by means of the link rods 44.

45 indicates the weight balls on the outer ends of the governor arms. To diametrically opposite sides of the clutch disk 35 which is loosely mounted on the shaft 16 the bell hammers 46 are pivotally attached.

It will be apparent from this description that when the gear 25 is locked upon the shaft 22 and said shaft positively driven, rotation is transmitted to the vertical shaft 16. The governor rotates with said shaft and when a predetermined speed has been acquired, the weighted ends of the governor arms move outwardly by centrifugal force and the lower collar 41 is drawn upwardly, thereby also moving the rod 18 upwardly in the hollow portion of the shaft 16 through the medium of the pin connection 42. As the upper end of this rod is connected to the collar 36 by means of the pin 37, it will be obvious that the clutch disk 35 is thereby forced upwardly into frictional engagement with the fixed clutch disk 34 on the shaft 16. The disk 35 is thus rotated and the bell hammers 46 are thrown outwardly by centrifugal action into engagement with the bell bowl 33, thereby sounding the alarm.

The means for shifting the clutch collar 31 into or out of locked engagement with the gear 25 includes a pair of arms 49 which are fixed at one of their ends upon a rod 50. This rod is journaled at its extremities in suitable bearing members 51 secured to the opposite side walls of the lower compartment 10 of the casing. The other ends of the arms 49 are provided with pins or studs loosely engaged in a peripheral groove 31' formed in the clutch collar 31. To one end of the rod 50 a lever 52 is secured, said lever being connected at its other end to a link 53 which in turn is loosely connected to the lower end of a rod or bar 54. Upon a stud pin 55 fixed in one of the side walls of the compartment 10 and projecting inwardly therefrom a compound lever is loosely mounted. One arm 56 of this lever is connected to the lower end of the bar 54. In the other arm 56' thereof a pin 57 is loosely mounted. This pin extends through an arcuate slot 58 formed in one of the side walls of the compartment 10. A head 59 formed on the outer end of said pin is provided with a reduced cylindrical portion 59' for engagement in one of the enlarged ends 58' of the slot 58, whereby the compound lever is locked against movement. The pin is yieldably held in such locking position by means of a coil spring 60 which is arranged upon the inner end of said pin between the lever arm and a collar or sleeve 61 arranged upon the pin.

The upper end of the bar 54 extends through a short longitudinal slot 62 in the partition wall 8 of the casing, and is connected to one end of an arm 63, the other end of which is fixed upon a rock shaft 64 journaled at its ends in bearing members 65 secured to the opposed side walls of the upper compartment 9 of the casing. Lens carrying frames 66 are secured upon the rod or shaft 64 adjacent its ends, and each of these frames carries a colored lens 67 which is adapted for movement over the corresponding uncolored lens 12 in one of the side walls of the casing. The arm 63 to which the upper end of the bar 54 is connected is preferably formed integral with one of the lens frames 66.

The bracket plate having spaced ears 68 is arranged in the pocket or recess 11 and secured to the rear wall of the compartment 9. A pin 69 is secured in said ears and upon the pin the tapering blades 70 are loosely mounted. Each of these blades is provided upon its smaller end with an angular arm or extension 71. To said angular arms of the respective blades the wires or cables 72 are attached at one of their ends. These cables extend through an opening 73 provided in the wall of the casing 6 and over guide pulleys 74 which are suitably mounted upon the inner face of said wall. From the pulley 74 one of the cables extends downwardly and around a second pulley 75 mounted upon the partition wall 8. The other ends of said cables are attached to an arm 76 which is fixed upon the rock shaft 64.

As shown in the accompanying drawings, the clutch collar 31 is out of locking engagement with the gear 35 so that the mechanism is inoperative. One of the blades 70 is painted white while the other blade is painted red, and it will be observed that the arms 71 of the blades project upon relatively opposite sides of the pin 69 upon which said blades are mounted. When the device is not in operative condition, the white blade 70 extends upwardly from the pocket 11 above the casing 6, while the red blade extends downwardly into said pocket and is invisible. When it is desired to render the mechanism operative to give an alarm, the operator shifts the knob or button 59 on the arm 56' of the compound lever in the arcuate slot 58 to the left of its full line position shown in Fig. 3. In this movement of said lever, it will be obvious that the bar 54 is forced upwardly through the slot 62 in the partition wall 8, and the lever 52 is consequently moved upwardly to rotate the rod 50 so that the arms 59 on said rod will shift the clutch member 31 to the right and into locking engagement with the gear 25. Thus, the shaft 22 will be positively driven through the medium of the flexible shaft 21 geared to one of the wheels of the machine, and the vertical shaft 16 rotated. The button 59 must, of course, be pulled outwardly against the action of the spring 60 in order to move the same in the slot 58 and upon a release of the button, the same is engaged by the action of said spring in the enlarged end of the slot to lock the compound lever against movement, and thus preclude the reverse shifting movement of the clutch collar. When the bar 54 is forced upwardly, as above explained, the shaft 64 is rocked through the medium of the arm 63 to which said bar is connected and the arm 76 on said shaft moved to the position shown in dotted lines in Fig. 3. In such movement of the arm, the white blade 70 falls downwardly by gravity into the pocket 11, one of the cables 72 being drawn outwardly through the opening 73 in the casing wall. The other of the cables which extends around the pulley 75 is pulled upwardly by the arm 76, and the red blade to which said latter cable is connected is raised out of the pocket so that it will extend above the casing 6 to a visible position, thus indicating that the alarm mechanism is in operative condition. When the speed of the machine has attained a predetermined limit, the governor arms act to shift the sliding clutch member 35 as above explained, whereby the alarm is sounded.

It will be apparent that as the device is arranged upon the forward end of the machine body, the operator can not obtain access to the same from his seat, and it is therefore imperative that he stop the car and descend in order to change the mechanism from its operative to its inoperative condition and reverse the positions of the blades 70 to indicate an open or unlimited speed, or vice versa, as circumstances may require. In the comparatively congested districts of a city where the traffic is heavy, certain municipal ordinances have been promulgated to limit the speed of travel of such vehicles, and the traffic officers by simply observing the blade 70 and noting its color may at once determine whether or not the mechanism is in condition for operation. The alarm bell serves as a warning to the driver as well as a notification to the officers that the machine is traveling at an unlawful speed.

The rear end of the lower compartment 10 of the casing is closed by means of a hinged door 77 whereby access may be had to said compartment for the adjustment of the governor collar to various positions. This door is securely fastened by means of a hasp 78 and a staple 79 on the door, the latter receiving a pad-lock or other suitable locking means. The top wall of the casing 6 is also preferably provided with an outlet flue 80 arranged immediately above the lamp or torch 13 through which the smoke and fumes from the lamp are exhausted to the atmosphere. Simultaneously with the operation of the blades 70 in the manner above explained, the lens carrying frames 66 secured upon the rod 64 are moved to dispose the colored lenses therein opposite to the lenses 12 and between the same and the lamp 13, in order to give a clear visual night signal of the condition of the mechanism. When the device is not in condition for operation, said lenses 67 are positioned at one side of the lenses 12 as shown in Fig. 3 of the drawings.

From the foregoing description taken in connection with the accompanying drawings, the construction, manner of operation, and several advantages of my invention will be clearly and fully understood.

The device affords a reliable means for warning the operator of the machine when he is operating the machine at an excessive speed, and also serves to eliminate any possible controversies between the driver and the traffic officer as to the speed of travel. It will therefore be appreciated that the driver may relieve himself of considerable annoyance as well as possibility of pecuniary loss.

My improved alarm mechanism is comparatively simple in its construction, highly efficient and reliable in practical use and may be produced at small manufacturing cost.

While I have above described the preferred form, construction, and arrangement of the several elements employed, it will be understood that the device is, nevertheless, susceptible of considerable modification therein, and I therefore reserve the privilege of resorting to all such legitimate changes as may be fairly embodied within the spirit and scope of the invention as claimed.

What is claimed is:

1. The combination with a motor vehicle, of an alarm mechanism having a housing mounted upon the body of the vehicle remote from the driver's seat, visual signaling means mounted on said housing, operating means for said mechanism, and manually operable means arranged within the housing for coöperatively connecting said operating means with the alarm mechanism and simultaneously actuating said signaling means.

2. The combination with a motor vehicle, of an alarm mechanism and housing therefor mounted upon the vehicle body remote from the driver's seat, operating means for said alarm mechanism, manually operable means mounted within the housing to establish a positive driving connection between said operating means and the alarm mechanism, visual signaling means, and mechanical connections between said signaling means and said manually operable means to indicate the existence or non-existence of a driving connection between the operating means and the alarm mechanism.

3. An alarm mechanism and housing therefor, operating means for said mechanism, a shiftable element mounted within the housing to establish or destroy the driving connection between the operating means and the alarm mechanism, visual signaling means mounted on the housing, manually operable means for actuating said shiftable element, and mechanical connections between the signaling means and said manually operable means whereby the signal is actuated simultaneously with said shiftable element to indicate the existence or non-existence of a driving connection between the operating means and the alarm mechanism.

4. In an alarm device for vehicles, an alarm mechanism including a shaft, a bell bowl arranged in concentric relation to said shaft, a clutch disk fixed upon the shaft, a second clutch disk longitudinally shiftable upon said shaft and provided with bell hammers to engage said bowl, a governor on said shaft including a sliding collar, means geared to one of the vehicle wheels to rotate said shaft, and means connected to said collar to actuate the shiftable clutch disk and engage the same with the fixed disk for rotation with the shaft whereby the alarm is sounded when the vehicle attains a predetermined speed.

5. In an alarm device for vehicles, an alarm mechanism including a shaft having a hollow portion, an alarm device proper comprising a shiftable element mounted upon said shaft and provided with means for sounding the alarm, a centrifugal governor mounted upon said shaft and including a sliding collar, means geared to one of the vehicle wheels for rotating said shaft, and means operating in the hollow portion of the shaft and connected to said sliding collar to actuate the shiftable member and sound the alarm when the vehicle attains a predetermined speed.

6. In an alarm device of the character described, an alarm mechanism including a shaft, a shiftable element mounted upon said shaft and provided with an alarm sounding means, a centrifugal governor mounted upon the shaft and having a sliding collar, means for rotating said shaft geared to one of the vehicle wheels, and a rod connected to said collar and movable longitudinally of the shaft to shift said element and sound the alarm when the vehicle attains a predetermined speed.

7. In an alarm device for vehicles, an alarm mechanism including a bell bowl, a rotary clutch disk, means geared to one of the vehicle wheels for driving said disk, a shiftable clutch disk provided with alarm sounding means for engagement with the bell bowl, and means for shifting the latter disk into locked engagement with the rotary disk when the vehicle attains a predetermined speed whereby the alarm is sounded.

8. In an alarm device for vehicles, an alarm mechanism including a hollow shaft, a bell bowl, a clutch disk fixed upon said shaft, a shiftable clutch disk mounted on the shaft and provided with alarm sounding means for engagement with said bowl, a centrifugal governor on said shaft having a slidably mounted collar, a rod longitudinally movable within the shaft and connected to said collar at one of its ends, means geared to one of the vehicle wheels for operating said shaft, and means connected to the other end of said rod to actuate the shiftable disk and engage the same with the fixed clutch disk when the vehicle attains a predetermined speed to rotate the shiftable disk and sound the alarm.

9. In an alarm device for vehicles, an alarm mechanism including a hollow shaft, a bell bowl, a clutch disk fixed upon said shaft, a shiftable clutch disk mounted on the shaft and provided with alarm sounding means for engagement with said bowl, a centrifugal governor on said shaft having a slidably mounted collar, a rod longitudinally movable within the shaft and connected to said collar at one of its ends, means geared to one of the vehicle wheels for operating said shaft, and means connected to the other end of said rod to actuate the shiftable disk and engage the same with the fixed clutch disk when the vehicle attains a predetermined speed to rotate the shiftable disk and sound the alarm.

In testimony whereof I hereunto affix my signature in the presence of two witnesses.

ROBERT B. WILCOX.

Witnesses:
   HARRIET G. FORBES,
   HARRY HALPEN.